(12) United States Patent
Maguire

(10) Patent No.: US 7,390,119 B2
(45) Date of Patent: Jun. 24, 2008

(54) METHOD AND APPARATUS FOR STORING AND DELIVERING LIQUID COLOR MATERIALS

(76) Inventor: Stephen B. Maguire, 935 Parkerville Rd., West Chester, PA (US) 19380

( * ) Notice: Subject to any disclaimer, the term of this patent is extended or adjusted under 35 U.S.C. 154(b) by 0 days.

(21) Appl. No.: 11/810,046

(22) Filed: Jun. 4, 2007

(65) Prior Publication Data

US 2007/0297278 A1 Dec. 27, 2007

Related U.S. Application Data

(63) Continuation of application No. 10/856,422, filed on May 28, 2004, now abandoned.

(60) Provisional application No. 60/474,066, filed on May 28, 2003.

(51) Int. Cl.
*B01F 15/02* (2006.01)

(52) U.S. Cl. ............. 366/141; 366/151.1; 366/181.8; 222/52; 222/77; 177/70

(58) Field of Classification Search .......... 141/9, 141/83, 10; 177/70; 222/52, 77; 366/76.2, 366/141, 151.1, 181.8

See application file for complete search history.

(56) References Cited

U.S. PATENT DOCUMENTS

| | | | | | |
|---|---|---|---|---|---|
| 600,233 | A | * | 3/1898 | Palm | 222/77 |
| 3,814,388 | A | * | 6/1974 | Jakob | 366/131 |
| 3,957,399 | A | * | 5/1976 | Siczek | 417/387 |
| 4,185,948 | A | * | 1/1980 | Maguire | 417/477.9 |
| 4,473,173 | A | * | 9/1984 | DeGroff et al. | 222/63 |
| 4,571,416 | A | * | 2/1986 | Jarzombek et al. | 524/474 |
| 4,606,710 | A | * | 8/1986 | Maguire | 417/477.6 |
| 5,225,210 | A | * | 7/1993 | Shimoda | 425/145 |
| 6,007,236 | A | * | 12/1999 | Maguire | 366/141 |
| 6,057,514 | A | * | 5/2000 | Maguire | 177/105 |
| 6,188,936 | B1 | * | 2/2001 | Maguire et al. | 700/265 |
| 6,402,363 | B1 | * | 6/2002 | Maguire | 366/141 |
| 6,719,453 | B2 | * | 4/2004 | Cosman et al. | 366/141 |

* cited by examiner

*Primary Examiner*—David Sorkin
(74) *Attorney, Agent, or Firm*—Charles N. Quinn; Fox Rothschild LLP

(57) ABSTRACT

A container of liquid color material has a diaphragm liquid color pump located therewithin for providing liquid color from the container and non-drip apparatus for releaseably connecting the container with a blender for supply of liquid color thereto and methods for pumping and supplying liquid color incorporating the same. In some embodiments a volumetric controller is utilized for driving and regulating the pump.

1 Claim, 14 Drawing Sheets

METHOD AND APPARATUS FOR STORING AND DELIVERING LIQUID COLOR MATERIALS

CROSS-REFERENCE TO RELATED PATENT APPLICATIONS

This patent application is a 35 USC 120 continuation of Ser. No. 10/856,422, filed 28 May 2004 now abandoned in the name of Stephen B. Maguire, which claimed the benefit of U.S. provisional application Ser. No. 60/474,066 filed 28 May 2003 in the name of Stephen B. Maguire for "Liquid Color Pumping Method and Supply Apparatus", the priority of which is claimed under the applicable provisions of 35 USC 119 and 120.

BACKGROUND OF THE INVENTION—FIELD OF THE INVENTION

This invention relates to methods and apparatus for handling liquid color material used to impart color to molded and extruded plastic objects.

BACKGROUND OF THE INVENTION—DESCRIPTION OF THE PRIOR ART

Liquid color material for use in plastics material processing is conventionally shipped either in five gallon pails, which are typically plastic, or in thirty gallon drums, which may be either steel or plastic, or in "totes", which are large rectangular plastic containers about forty-two inches along one side and which may hold up to 2,400 pounds of liquid color material.

The smaller containers, namely the five gallon pails and the thirty gallon drums, are generally not returned by the purchasers to the liquid color material suppliers. However, the totes are nearly always returned.

It is beneficial for purchasers to return the totes to the liquid color material supplier since return eliminates any environmental problem which might otherwise be encountered by the purchaser through disposal of empty totes. Additionally, unused liquid color material in the bottom of the tote or sticking to the sides of the tote can be weighed and credited to the purchaser, since the tote will be refilled and sold again with the same color material.

SUMMARY OF THE INVENTION

In one of its aspects, this invention provides a low cost liquid color pump which preferably may be positioned in a liquid color material shipping container, which may include a liquid-tight disconnect, allowing provision of the liquid color output from the pump directly or indirectly to a plastics material processing machine in which the liquid color preferably imparts color directly to plastic parts being manufactured or to plastic resin material being blended for subsequent fabrication such as by injection or compression molding or by extrusion. An air line may power the pump within the container and is desirably connected to a source of pressurized air.

In accordance with the invention, liquid color containers are desirably sealed at the liquid color factory so that a purchaser of the liquid color material preferably never opens the container or has any access to the liquid color material in the container, except through preferably self-sealing quick disconnect connections which preferably shut off when disconnected, thereby preventing liquid color outflow from the container.

Desirably, a pump in accordance with the invention is a diaphragm pump, preferably generally cylindrical in shape, and preferably on the order of about three inches (3"), which is about seven and one-half (7.5) centimeters, in diameter by about one and one-half inches (1-½"), which is about two (2.0) centimeters, thick. Most desirably, a preferably flat diaphragm is sandwiched between a pump upper portion and a body having an exterior which is preferably in the general shape of a cylinder. The body desirably has an open interior defined by a cavity which preferably step-wise tapers down from a relatively large size to a liquid inlet aperture preferably located in the center of the bottom of the body. A ball, desirably about three quarters (¾) of an inch, which is about two (2.0) centimeters, in diameter is movable vertically and seats on the inlet aperture at the bottom of the open interior cavity, acting as a check valve allowing liquid to enter, but not leave, through the inlet defined by the aperture. An outlet port is formed in the side of the pump body.

Desirably a spring within the pump biases the diaphragm in a direction away from the open interior cavity.

A pneumatically driven piston rod extension desirably reciprocably displaces the diaphragm towards the open interior cavity, displacing liquid color from the pump open interior cavity out through the outlet aperture. The spring desirably returns the diaphragm at least to the diaphragm original flat or neutral position and preferably past such neutral position, thereby sucking in liquid color through the inlet aperture which is preferably directly below the diaphragm.

In another one of its aspects, this invention provides apparatus for furnishing liquid color on demand to one or more plastics processing machines where the apparatus includes a closeable container having at least one outlet which is preferably self-sealing, with preferably a diaphragm pump connected to and housed within the container interior for pumping liquid out of the container via the outlet connection, responsive to pressurized gas. The closeable container is preferably difficult, indeed preferably nearly impossible, for the customer to open. This feature in combination with the self-sealing outlet minimizes the likelihood of the liquid color customer spilling any significant amount of liquid color material in the customer's plastics material processing facility.

In yet another one of its aspects, this invention provides apparatus for furnishing liquid color on demand where the apparatus includes a container preferably having a quick-disconnect, self-sealing outlet connection. Preferably, the apparatus further includes a pneumatic piston-cylinder combination removably connected to the container and adapted for pneumatically-driven reciprocation of an output shaft portion of the combination. The apparatus further preferably includes a reciprocable rod within the container with a first end of the rod being adapted for reciprocating driving of the rod by an output shaft of the piston-cylinder combination. The apparatus preferably further includes diaphragm pump means connected to and housed at least partially, and preferably wholly, within the container for pumping the liquid color out of the container via the outlet connection. The pump includes a diaphragm and preferably also a spring for biasing the diaphragm away from an open interior cavity portion of the pump. The diaphragm preferably is displaceable into the open interior cavity portion responsively to reciprocating motion of the rod, to displace fluid from the open interior cavity of a pump body within which the diaphragm is positioned.

The invention may further embrace means for releasably retaining the piston-cylinder combination in position on the container for reciprocating contact of the piston-cylinder combination with the rod, where the releasable retaining means may further include a moveable sleeve connected to the piston-cylinder combination. The sleeve desirably has at least one slot preferably extending first axially away from the terminus of the sleeve, towards the piston-cylindrical combination and preferably then in an annular direction partially around the sleeve.

In yet another of its aspects this invention may embrace a method for furnishing liquid color to a plastics resin processing machine where the method includes providing a preferably closed container having at least one outlet connection with the container preferably having liquid color material therewithin, pumping the liquid color material out of the container preferably via the outlet connection by pneumatically or preferably mechanically reciprocating a diaphragm to displace the diaphragm into a body including an open interior cavity thereby forcing liquid color material within the body preferably through an aperture in the body and out of the container via the outlet connection.

In yet another of its aspects, this invention embraces a liquid color diaphragm pump where the pump preferably includes a body having a cavity formed therein and a cover connected to the body. A flexible diaphragm preferably separates the cover from the cavity. The cover has a relief located proximate to the portion of the diaphragm which separates the cover from the cavity, with the relief providing space between the cover and the diaphragm. The pump further includes means for cyclically displacing the diaphragm away from the relief area of the cover and into the cavity. The pump preferably further includes means for biasing the diaphragm away from the cavity, towards the relief area of the cover and preferably into the space thereunder during a portion of each reciprocating cycle of diaphragm displacement.

Desirably, the means for cyclically displacing the diaphragm is a reciprocating means and contacts the diaphragm. Further desirably, the means for biasing the diaphragm away from the cavity is a spring, most preferably a coil spring. The body of the pump preferably has a passageway connecting a body bottom surface to the cavity with at least a portion of the passageway being substantially vertical and the pump further comprising a freely vertically moveable ball residing within the cavity vertical portion for blocking downward liquid flow within the cavity vertical portion. The vertically freely moveable ball is preferably resident within the spring so that the spring constrains the ball against lateral movement.

In another aspect of the invention, disclosed herein is an apparatus and method for supplying liquid color to a plastic resin processing machine. In some embodiments of this aspect of the invention, the apparatus and method include a closed container and a pump within the container. The pump comprises a housing having a cavity formed therein, a diaphragm displaceable into the cavity for urging liquid color out of the cavity via an outlet passageway through the housing, and a reciprocable rod extending into the housing for displacing the diaphragm into the cavity. The apparatus and method also involve a drive outside the container for reciprocating the rod. The drive comprises a motor having an output shaft, a cam connected to the shaft for rotation thereby, and a follower positioned in riding contact with the cam, movable transversely respecting the shaft responsively to rotation of the cam and connected to the rod to reciprocate the rod thereby displacing the diaphragm.

In this aspect of the invention some embodiments include self-sealing means connected to the outlet passageway at the exterior of the container for preventing flow of liquid color out of the container via the outlet passageway upon disconnection of the apparatus from a liquid color user. Some embodiments have a spring-loaded, preferably manually actuable quick-disconnect as the self-sealing means. In some embodiments, there is liquid color in the container. Depending on the embodiment, the motor may be pneumatically, hydraulically, electrically or mechanically driven. In some embodiments of this aspect of the invention, the reciprocating rod contacts the diaphragm.

In this aspect of the invention some embodiments include the pump comprising means for biasing the diaphragm away from the cavity, during a portion of a cycle of diaphragm displacement. These means may comprise a coil spring. In some embodiments, the housing has an inlet passageway connecting a pump exterior surface to the cavity, with at least a portion of the passageway being substantially vertical, with the pump further comprising a freely vertically movable ball residing in the passageway vertical portion, for blocking liquid color flow downward within the passageway and out of the pump. In some embodiments, the ball is within the spring and/or the spring constrains the ball against lateral movement.

In some embodiments, the pump exterior surface is a bottom surface of the pump housing. An outlet passageway leads from a vertical extremity of the cavity to the exterior of the pump for conveyance of liquid color, displaced from the cavity by the diaphragm, out of the pump. The apparatus may include an outlet passageway communicating with the cavity adjacent to the diaphragm and leading to the exterior of the pump for conveyance of liquid color displaced from the cavity by the diaphragm out of the pump. In some embodiments, the outlet passageway has a vertical portion and the pump further comprises a freely vertically movable ball residing in the outlet passageway vertical portion, for blocking liquid flow downward within the outlet passageway and into the pump.

In some embodiments of the invention, the apparatus and methods include a drive control means for actuating the motor. The drive control means preferably comprises an electronic controller and an at least temporary memory, with the electronic controller programmed to activate the motor according to a desired volume of liquid color. In some embodiments, the electronic controller is adapted to be programmed by either or both a user input device and an external device when connected to an external connection of the electronic controller.

DESCRIPTION OF THE PREFERRED EMBODIMENTS AND BEST MODE KNOWN FOR PRACTICING THE INVENTION

The disclosures of U.S. Pat. No. 6,007,236 and corresponding Patent Cooperation Treaty Patent Application PCT/US96/19485 published as WO97/21528 are incorporated by reference herein.

Figure 1:
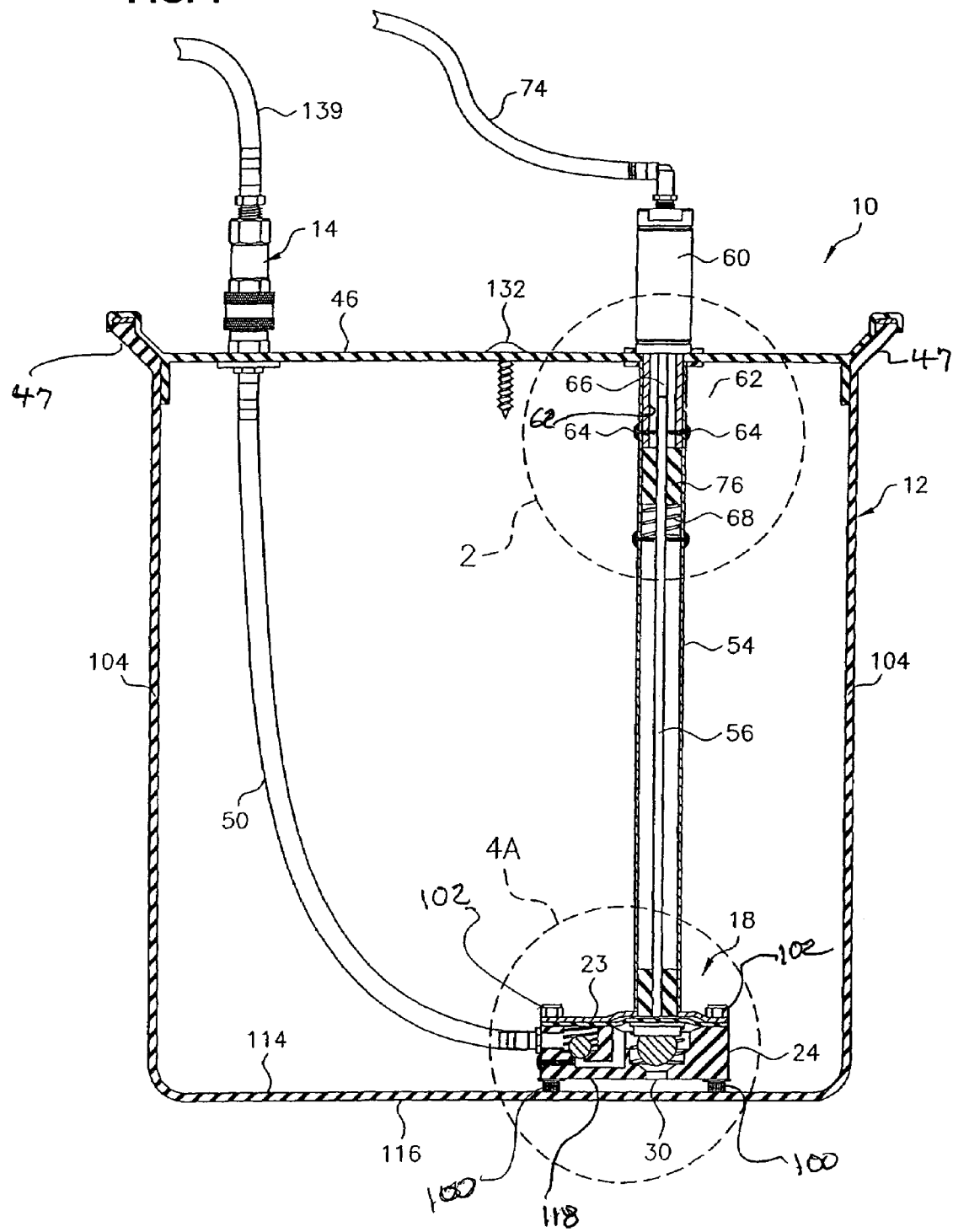
FIG. 1 is a schematic front assembly view, in elevation, with many of the parts depicted in section, of a container used for supply of liquid color material and having a liquid color pump therewithin, all in accordance with the invention

Referring to the drawings in general and to FIG. 1 in particular, apparatus for furnishing liquid color material to a plastic resin processing machine is designated generally 10. Apparatus 10 includes a closeable container 12 preferably having a quick disconnect self-sealing outlet connection 14. Closeable container 12 includes a lid 46 and a body 104. Lid 46 is preferably secured to body 104 in a manner that removal of lid 46 from body 104 by a purchaser of liquid color material within container 12 is difficult. This may be accomplished by mechanically crimping, cementing, welding or otherwise securing the periphery of lid 46 to illustrated angularly upwardly extending lip portions 47 defining the upper extremities of body 104.

Figure 3:
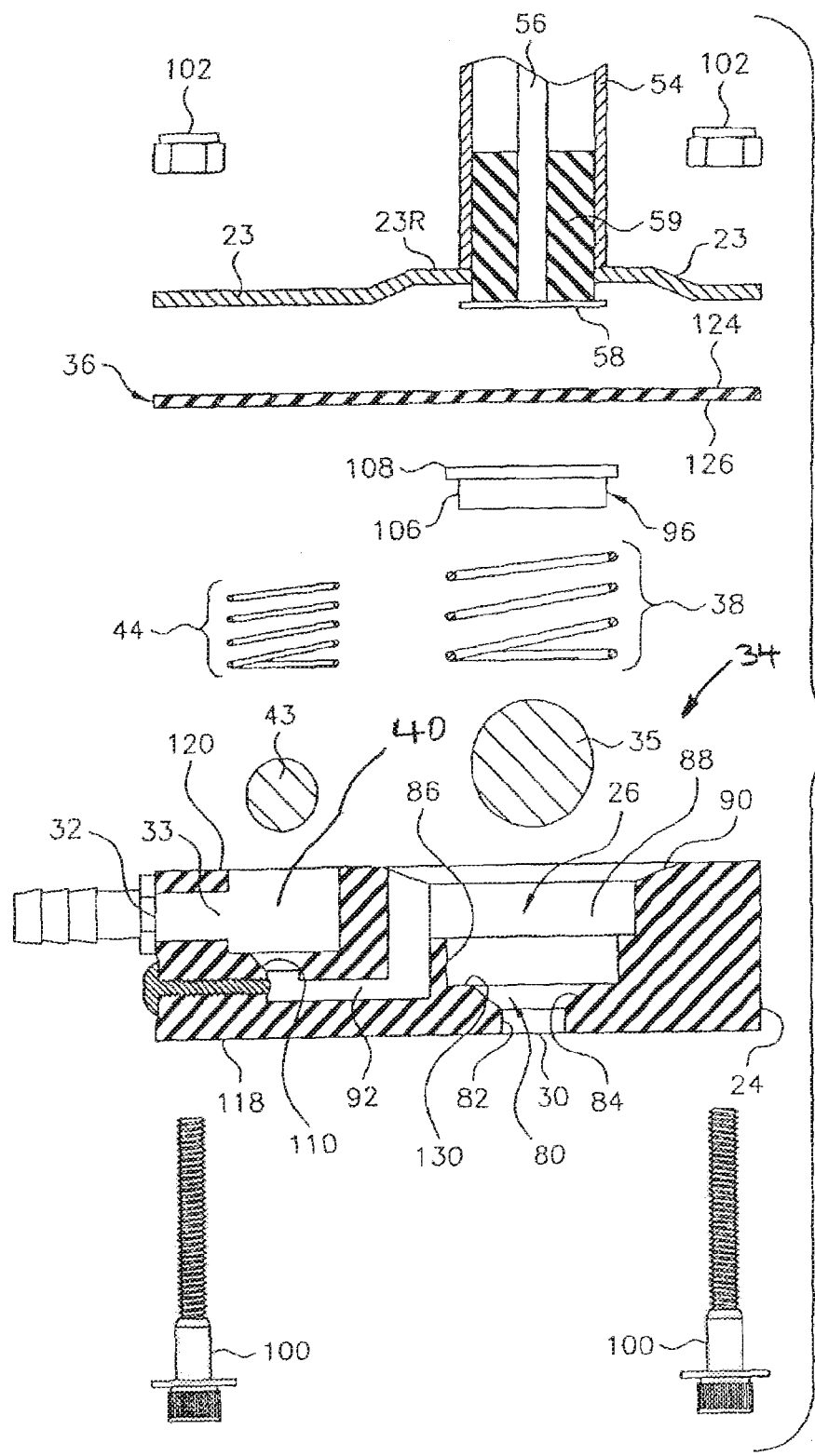
FIG. 3 is a broken exploded partial front view with some parts depicted in section, showing details of a portion of the structure of FIG. 1 indicated generally by dotted circle 4A in FIG. 1.
Figure 4A:
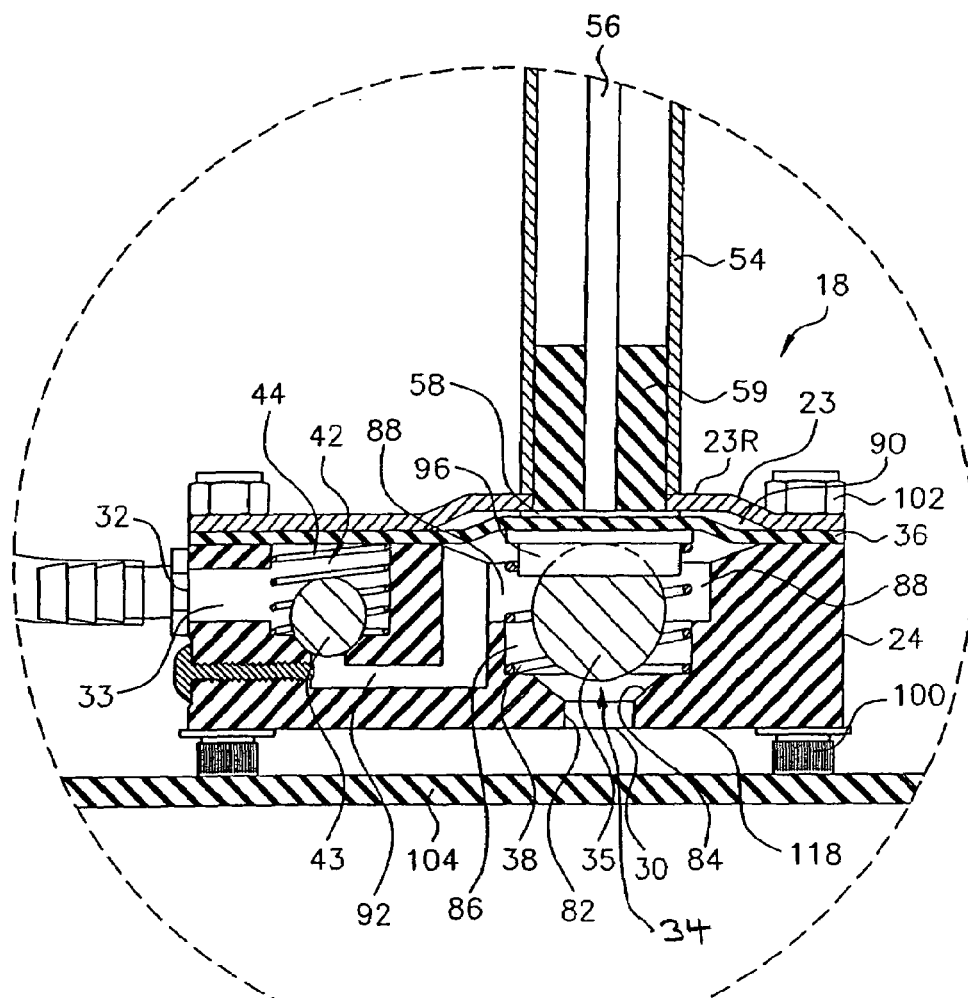
FIG. 4A is an enlarged front assembly view, with most of the parts shown in section, of the structure indicated generally by dotted circle 4A in FIG. 1, with a diaphragm portion of the structure undisplaced.
Figure 4B:
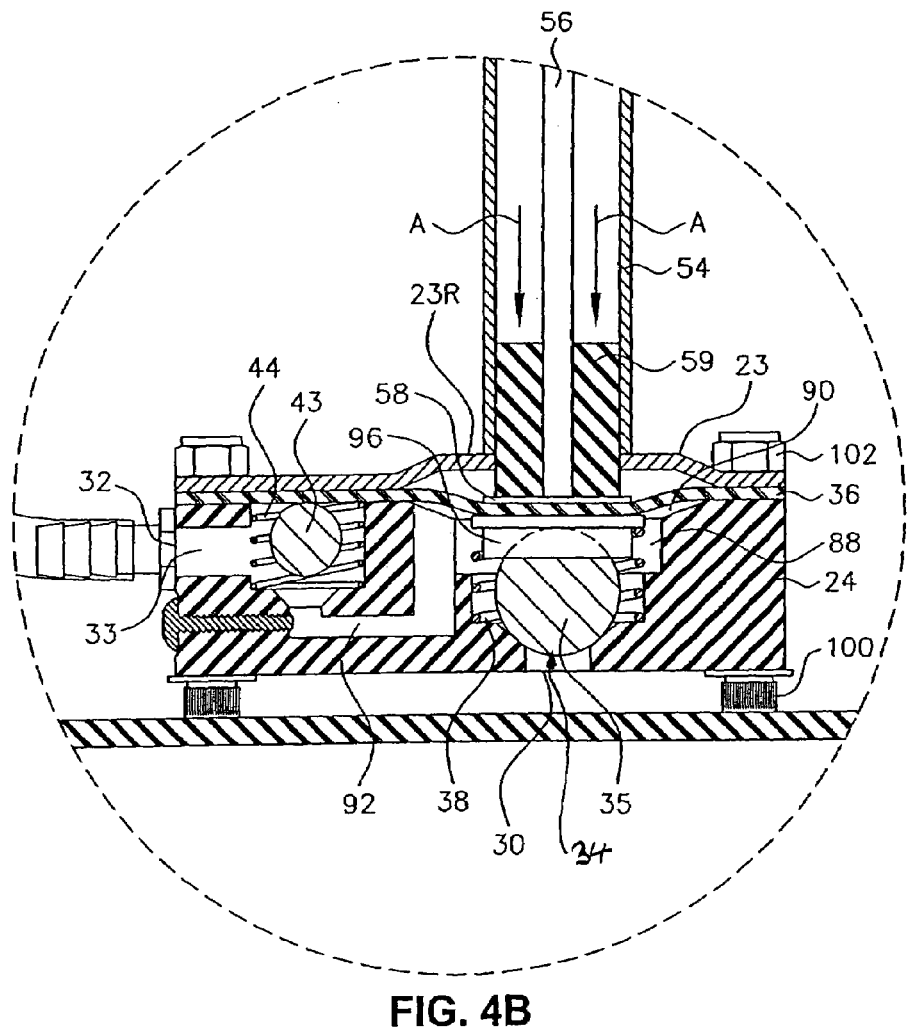
FIG. 4B is an enlarged front assembly view, similar to FIG. 4A, with most of the parts shown in section, of the structure indicated generally by dotted circle 4A in FIG. 1, but with the diaphragm portion of the structure depicted displaced as when pumping liquid color.

A diaphragm pump is designated generally 18 and is positioned within closeable container 12 as illustrated in FIG. 1. Diaphragm pump 18 includes a body 24 which is preferably generally cylindrical and preferably has an open interior cavity portion 26 (not marked in FIG. 1 but clearly indicated in FIG. 3). Inlet aperture 30, best shown in FIGS. 3, 4A and 4B, is formed in a downwardly facing bottom exterior surface 118 of pump body 24 and serves as an inlet for liquid color material entering diaphragm pump 18. Body 24 may be molded plastic material or may be machined from a solid block of metal.

As best shown in FIG. 1, diaphragm pump 18 preferably contacts and rests on the interior surface 114 of the bottom 116 of container body 104. Most desirably, downwardly facing bottom exterior surface 118 of pump body 24 is closely spaced from interior surface 114 of bottom 116 of container body 104 by the heads of bolts 100, which secure diaphragm pump 18 together, resting on interior surface 114. The resulting close spacing of downwardly facing pump bottom exterior surface 118 from container upwardly facing interior surface 114, which spacing preferably is on the order of one-quarter (¼) inch or less, assures that diaphragm pump 18 evacuates substantially all liquid color material within container 12 before container 12 is recycled.

Referring principally to FIGS. 1 and 3, bolts 100 threadedly engage nuts 102 thereby securing the assembly of diaphragm pump 18 together. Bolts 100 pass through bores formed in pump body 24, a flexible diaphragm 36 located along and in facing contact with an upper surface 120 of pump body 24, and a pump upper plate portion 23, to secure diaphragm pump 18 together, with assembly being effectuated in manner shown in the exploded view of FIG. 3. The bores through which bolts 100 pass in pump body 24, diaphragm 36 and pump upper plate portion 23 are not illustrated in the drawings to facilitate drawing clarity. Diaphragm pump 18 in its assembled form, secured together by bolts 100 and nuts 102, is illustrated in greater detail in FIGS. 4A and 4B.

As best shown in FIGS. 3, 4A and 4B, within pump body 24 an inlet check valve 34 is positioned within inlet aperture 30.

Inlet check valve 34 includes a ball 35 biased by its own weight against a conical seat portion 84 of an inlet passageway 80 leading into pump body 24 from inlet aperture 30. An inlet passageway formed in pump body 24 and leading to open interior cavity portion 26 is designated generally 80 in FIG. 3 and commences at first or inlet aperture 30 formed in downwardly facing exterior bottom surface 118 of pump body 24. Inlet passageway 80 has a first minor cylindrical portion 82 bordering first or inlet aperture 30.

Still referring principally to FIGS. 3, 4A and 4B, inboard of first minor cylindrical portion 82 in inlet passageway 80 is a conical seat portion 84 formed in pump body 24, which tapers to enlarge passageway 80 from a relatively small diameter at inlet aperture 30 to a larger diameter, which is not numbered in the drawings. Conical seat portion 84 terminates at a second intermediate cylindrical portion 86 of inlet passageway 80; second intermediate cylindrical portion 86 is preferably of larger diameter than the maximum diameter of conical seat portion 84.

Second intermediate cylindrical portion 86 in turn leads to third major cylindrical portion 88 which, together with second immediate cylindrical portion 86 and conical diaphragm receiving portion 90, discussed below, largely defines an open interior cavity portion 26 of pump body 24. As illustrated in FIG. 3, axial length of third major cylindrical portion 88 preferably exceeds axial length of second intermediate cylindrical portion 86 as well as the individual axial lengths of conical seat portion 84 and first minor cylindrical portion 82. Third major cylindrical portion 88 terminates at juncture with conical diaphragm receiving portion 90 which in turn tapers from the diameter of third major cylindrical portion 88 to an even larger diameter at a preferably planar upper surface 120 of pump body 24 of diaphragm pump 18.

Referring principally to FIGS. 1, 3, 4A and 4B, a coil spring 38 resides within inlet passageway 80 and fits slidably about ball 35. Coil spring 38 constrains ball 35 against significant lateral movement within inlet passageway 80 but preferably does not bias ball 35 vertically. Coil spring 38 preferably seats on an annular surface defining the lower boundary of second intermediate cylindrical portion 86 which in turn defines a portion of inlet passageway 80. The annular surface on which spring 38 seats is designated 130 in FIG. 3 and is radially outboard of and defines the maximum diameter and hence terminals of conical seat portion 84 of inlet passageway 80.

The end of spring 38 opposite that which seats on annular surface 130 carries a spring cap 96 which includes hollow cylindrical body portion 106 and a solid planar top portion 108, as illustrated in FIG. 3. Hollow cylindrical body portion 106 preferably fits in contact with the interior of coil spring 38, with coil spring 38 abutting an unnumbered annular downwardly facing surface of solid planar top portion 108 of spring cap 96.

Still referring principally to FIGS. 3, 4A and 4B, spring cap 96 facilitates constant application of bias by spring 38 against lower surface 126 of diaphragm 36. Spring 38 is preferably selected with spring constant and dimensions such that spring 38 continuously biases diaphragm 36 upwardly, against a preferably circular flange 58, in a manner that diaphragm 36 and flange 58 are constantly in facing contact one with another. The positions of diaphragm 36, flange 58, spring 38 and spring cap 96, when diaphragm 36 is in the extreme upward position (and still in contact with flange 58) are illustrated in FIG. 4A; the position of these components when diaphragm 36 is in the extreme downward position (at which diaphragm 36 is still in contact with flange 58) is illustrated in FIG. 4B. Hence, FIGS. 4A and 4B illustrate the respective limits of travel and limits of flexure of diaphragm 36 during reciprocation of an actuator rod 56 as reciprocably driven by a piston-cylinder combination 60. In FIG. 4B, double arrows A denote downward force exerted by actuator rod 56 via flange 58 on diaphragm 36, where such downward force has overcome the upwardly directed force of spring 38 and any resilient resistive force resulting from deformation of diaphragm 36 away from its neutral, unflexed position. The neutral, unflexed position of diaphragm 36 has not been illustrated in the drawings.

First inlet check valve is designated generally 34 and is defined by ball 35 contacting conical seat 84.

Pump body 24 includes an intermediate outflow passageway 92 leading from open interior cavity portion 26 to an intermediate vertical chamber 40, which in turn opens into an outlet passageway 33 for discharge of liquid color material pumped by diaphragm pump 18. The entrance to intermediate outflow passageway 92 is desirably located in an upper extremity of a surface bounding open interior cavity portion 26 of pump body 24, as illustrated in FIG. 3. This positioning minimizes risk of any air bubbles which may form in open interior cavity portion 26 being delivered with the liquid color by the pump. The outlet from diaphragm pump 18 is defined by an outlet aperture 32. An outlet fitting 122 is illustrated connecting with outlet aperture 32 in FIG. 3.

Desirably an outlet check valve is designated generally 42 and has a ball 43 seating vertically, due to force of gravity, against a preferably conical seat 110 present in vertically elongated intermediate chamber 40 formed in valve body 24. Outlet check valve 42 ensures that liquid color material only travels in one direction, namely outwardly, through outlet passageway 33. Ball 43 is moveable freely in the vertical direction. Weight of ball 43 seats ball 43 on conical seat 110. Force of liquid color moving through intermediate outflow passageway 92 into intermediate vertically elongated chamber 40 lifts ball 43 from conical seat 110. Any attempt by liquid color material to flow from intermediate chamber 40 back into intermediate outflow passageway 92 is precluded as ball 43 comes to rest on conical seat 110.

A coil spring 44 within chamber 40 desirably fits about ball 43 and constrains ball 43 from lateral movement within vertically elongated intermediate vertical chamber 40. Spring 44 preferably does not exert any vertical force on ball 43; preferably ball 43 is vertically freely moveable within the interior of coil spring 44 in chamber 40. Spring 44, by precluding lateral movement of ball 43, reduces the likelihood of ball 43 sticking and thereby rendering outlet check valve 42 inoperable.

First inlet check valve designated generally 34, defined by ball 35 contacting conical seat portion 84, assures that liquid color material entering open interior cavity portion 26 of pump body 24 exits pump body 24 via outlet passageway 33 and outlet aperture 32, not via inlet aperture 30 and inlet passageway 80.

Diaphragm 36 is moved in a first direction, downwardly considering the drawings, towards and into open interior cavity portion 26 by a flange 58 contacting an upper surface 124 of diaphragm 36. Lower surface 126 of diaphragm 36 faces open interior cavity portion 26 in pump body 24. Flange 58 is preferably secured to an end of actuator rod 56 as illustrated in FIGS. 1, 3, 4A and 4B. A flange support spacer 59 is preferably fixed to the upper surface of flange 58 and to the portion of actuator rod 56 immediately adjacent flange 58 and provides a bearing surface between actuator rod 56 and the interior surface of a cylinder 54. Preferably flange support spacer 59 is a solid plastic material having good lubricity.

Actuator rod 56 is housed reciprocably within a container interior cylinder 54, which is a hollow tube preferably connected at one end to pump upper plate portion 23 of diaphragm pump 18 as illustrated in FIG. 1. Actuator rod 56 is preferably connected at its opposite end to lid 46 of closeable container 12, as illustrated in FIGS. 1 and 2.

Figure 2:
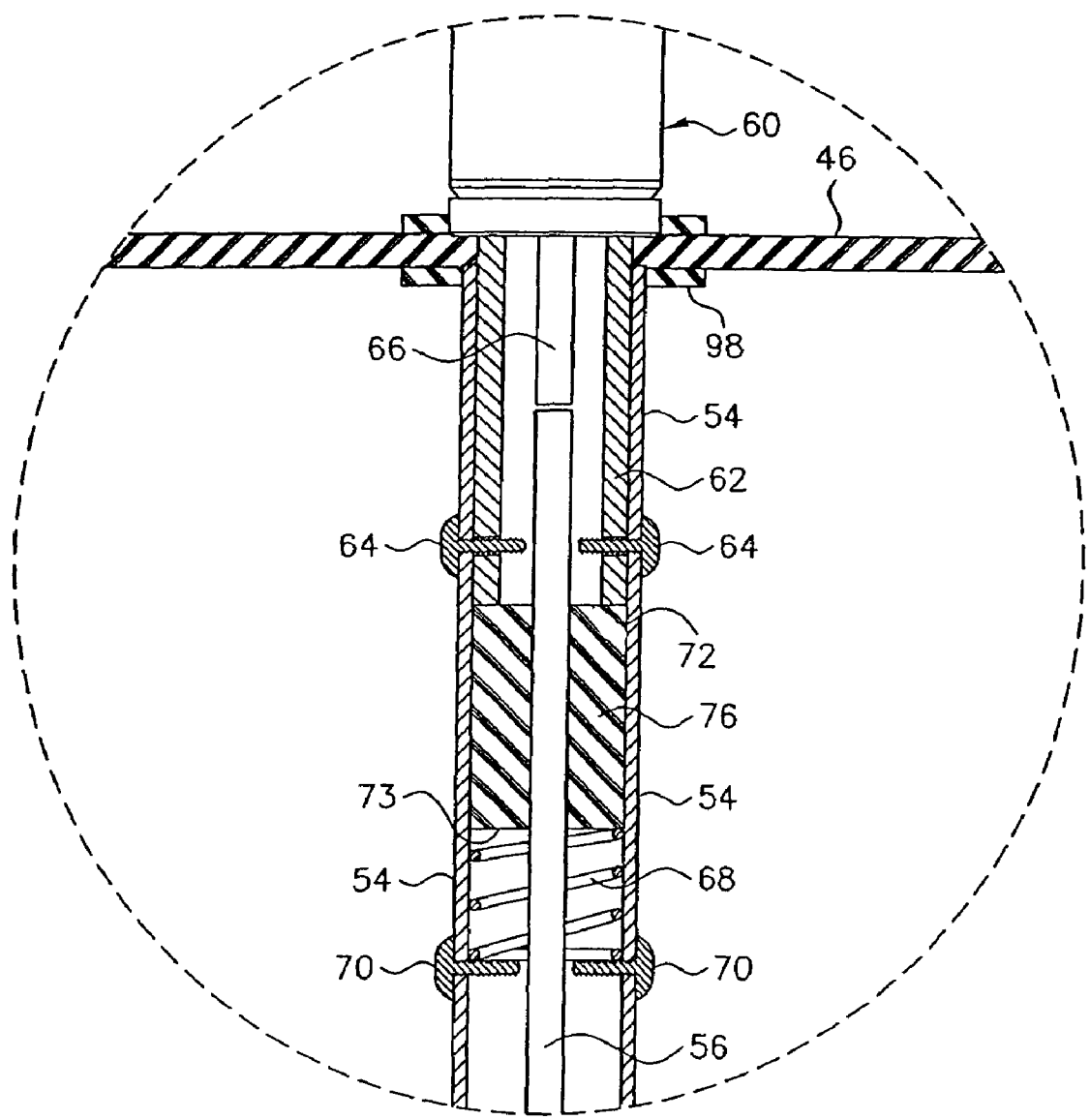
FIG. 2 is an enlarged front view in section, showing details of structure indicated generally by dotted circle 2 in FIG. 1.

The end of actuator rod 56 opposite that at which flange 58 is affixed is adapted for abutting contact by a rod 66 extending from a piston-cylinder combination 60 as illustrated in FIGS. 1 and 2. Piston-cylinder combination 60 is preferably a commercially available pneumatically driven piston-cylinder combination such as that sold under the trademark "SMC Cylinder". Piston-cylinder combination 60 receives pressurized air, via a hose designated 74 in FIG. 1, and an interior piston, not shown in the drawings reciprocates in response to the pressurized air. The reciprocating interior piston is mechanically connected to rod 66 so that rod 66 reciprocates unitarily with the reciprocating interior piston. Reciprocating motion provided by the interior piston of piston-cylinder combination 60 works to reciprocate actuator rod 56 through abutting contact thereof with rod 66 extending from piston-cylinder combination 60. Hence, reciprocation of the interior piston portion of piston-cylinder combination 60 results in reciprocation of flange 58, preferably in the vertical direction as illustrated in the drawings.

Referring to FIG. 2, preferably pneumatically powered piston-cylinder combination 60 is desirably equipped with a hollow cylindrical adapter 62 extending co-axially from piston-cylinder combination 60 with rod 66. Adapter 62 is preferably fixedly connected to piston-cylinder combination 60; adapter 62 does not move relative to piston-cylinder combination 60 as rod 66 reciprocates.

A coil spring 68 is located at the distal end of container interior cylinder 54 relative to diaphragm pump 18 and is retained in position within container interior cylinder 54 by screws 70 driven through the wall of cylinder 54 as illustrated in FIG. 2. Spring 68 is compressed in a vertical direction considering FIG. 2 by contact with a lower annular extremity surface 73 of a cylindrical bushing 76, the interior of which provides a sliding bearing surface for actuation rod 56. Bias of spring 68 against lower annular extremity surface 73 of cylindrical bushing 76 serves to bias bushing 76 upwardly, urging an upper cylindrical surface of bushing 76 against a lower extremity of stationary cylindrical adaptor 62 thereby retaining bushing 76 in position for sliding reciprocating contact therewith by actuator rod 56 as rod 56 reciprocates. The bias applied continuously by spring 68 to bushing 76 prevents "slop" from developing over time in the assembly illustrated in FIG. 2 as rod 56 reciprocates. The bias also facilitates quick connection and disconnection of piston-cylinder combination 60 to and from container 12, as described below.

A pair of radially opposed positioning screws 64 extend radially inwardly within container interior cylinder 54, at a position close to but somewhat removed from the upper extremity thereof as illustrated in FIG. 2. Cylindrical adapter 62 has a pair of vertically elongated radially opposed slots which open vertically downwardly into lower annular extremity surface 72 of adapter 62. Those slots, which are not visible in FIG. 2, are not illustrated elsewhere in the drawings and hence do not have indicator numerals associated therewith. The slots extend axially within cylindrical adapter 62 away from lower annular extremity surface 72 and then turn ninety degrees (90°) and extend a short distance angularly around cylindrical adapter 62. These slots extend entirely through the wall of cylindrical adapter 62. These slots are configured similarly to slots 158 illustrated in FIG. 6.

The slot configuration facilitates easy installation of piston-cylinder combination 60 on container 10. When piston-cylinder combination 60 is positioned so that cylindrical adapter 62 is inserted downwardly into the open interior of cylinder 54, the openings of the slots formed in lower annular extremity surface 72 of cylindrical adapter 62 may initially engage positioning screws 64; if they do not engage, slight manual rotation of cylindrical adaptor 62 effectuates their engagement.

During installation, as cylindrical adapter 62 is manually forced downwardly in FIG. 2 against upward force exerted on bushing 76 by coil spring 68, with the axially extending portions of the slots in cylindrical adapter 62 engaged by screws 64, once adapter 62 has moved sufficiently downwardly (in FIG. 2) that spring 68 is adequately compressed, piston-cylinder combination 60 and cylindrical adapter 62 may be manually rotated, causing the angular or circumferential portions of the unnumbered slots to engage screws 64. Once this manual rotation is complete and downward (considering FIG. 2) manual force on piston-cylinder combination 60 and cylindrical adapter 62 is released, spring 68 urges piston-cylinder combination 60 vertically upwardly (considering FIG. 2). This causes the angular extremity surfaces of the slots to contact lower surfaces of screws 64 thereby securing piston-cylinder combination 60 and adapter 62 securely in place.

Figure 6:
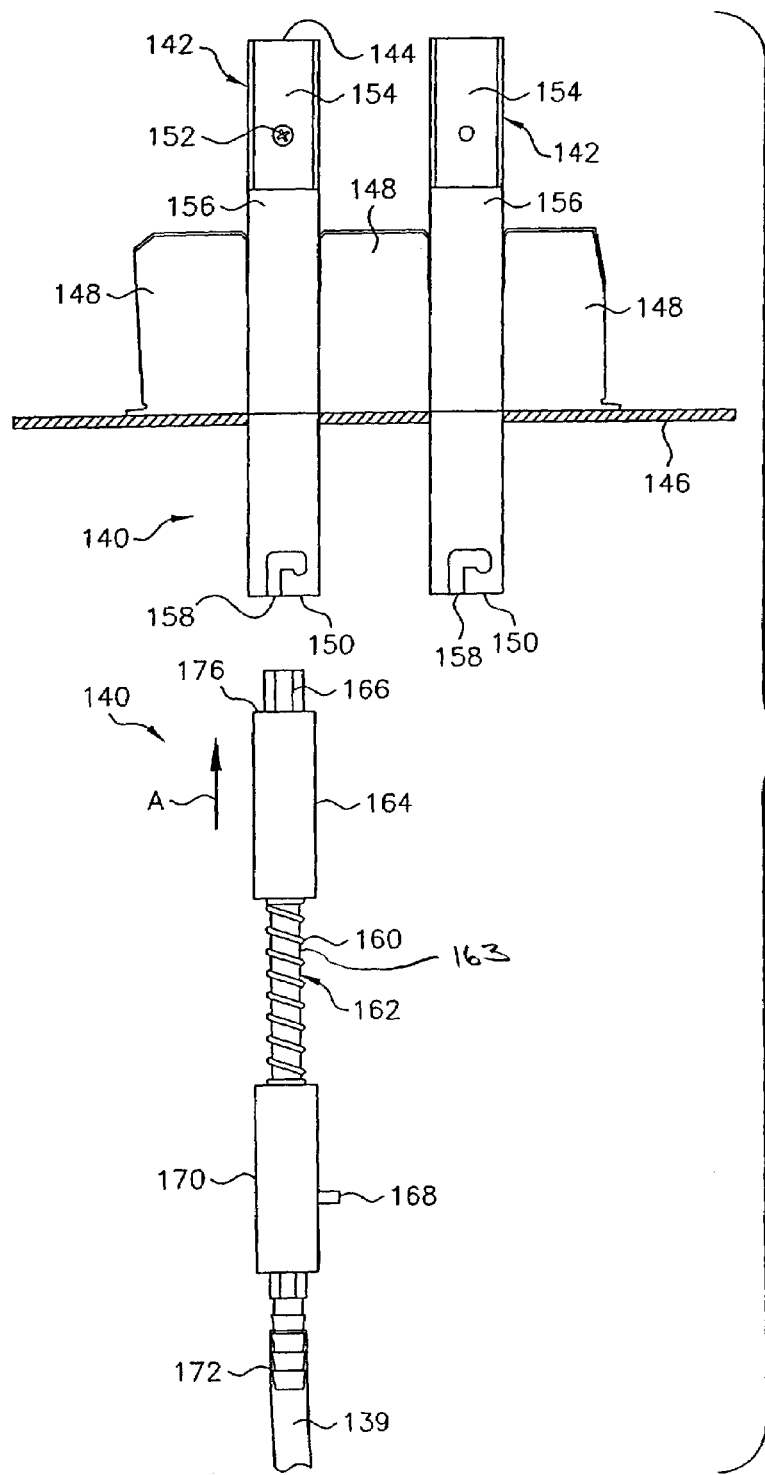
FIG. 6 is a broken partially schematic view of dripless liquid color connection apparatus adapted for attachment to a gravimetric blender or other device for serial supply of liquid color material to the blender or other device and adapted for on-the-fly changeover from an empty liquid color container to a full liquid color container without interruption of the production of plastic parts from the plastic resin of which the liquid color is an ingredient, in which only one connector for a liquid color container is illustrated, disengaged from the connection apparatus.

To assure the post-installation retention of piston-cylinder combination 60 in position, the angular extremity portions of the slots, at the ends remote from juncture with the axially extending portions of the slots, similar to slots 158 illustrated in FIG. 6, preferably have small undercuts therein extending axially away from piston-cylinder combination 60. These undercuts receive screws 64 and positively retain screws 64 in place, as the vertically upward force is applied to piston-cylinder combination 60 via spring 68 biasing cylindrical adaptor 62 upwardly in FIG. 2.

To remove piston-cylinder combination 60 from container 12, the sequence described above is reversed.

As illustrated in FIG. 2, the upper extremity of container interior cylinder 54 desirably is in abutting contact with the lower interior surface of lid 46 of container 12. Container interior cylinder 54 is preferably secured to lid 46 in some permanent fashion, for example by welding. As a result, when piston-cylinder combination 60 and adapter 62 are removed through application of angular and axial manual force to piston-cylinder combination 60, container interior cylinder 54 remains in place, being preferably fixedly secured to the interior of lid 46. Desirably, a liquid-tight fitting 98 of generally annular shape is provided about the exterior of container interior cylinder 54 at the position of juncture with lid 46 as illustrated in FIG. 2; this assures liquid-tight sealing about container interior cylinder 54 at the position of juncture with lid 46. It is further desirable that a stopper or other device be provided to occupy the interior opening of container interior cylinder 54 when pneumatic piston-cylinder combination 60 and adapter 62 have been removed. This provides additional assurance against any leakage of liquid color material out of container 12.

Figure 5:
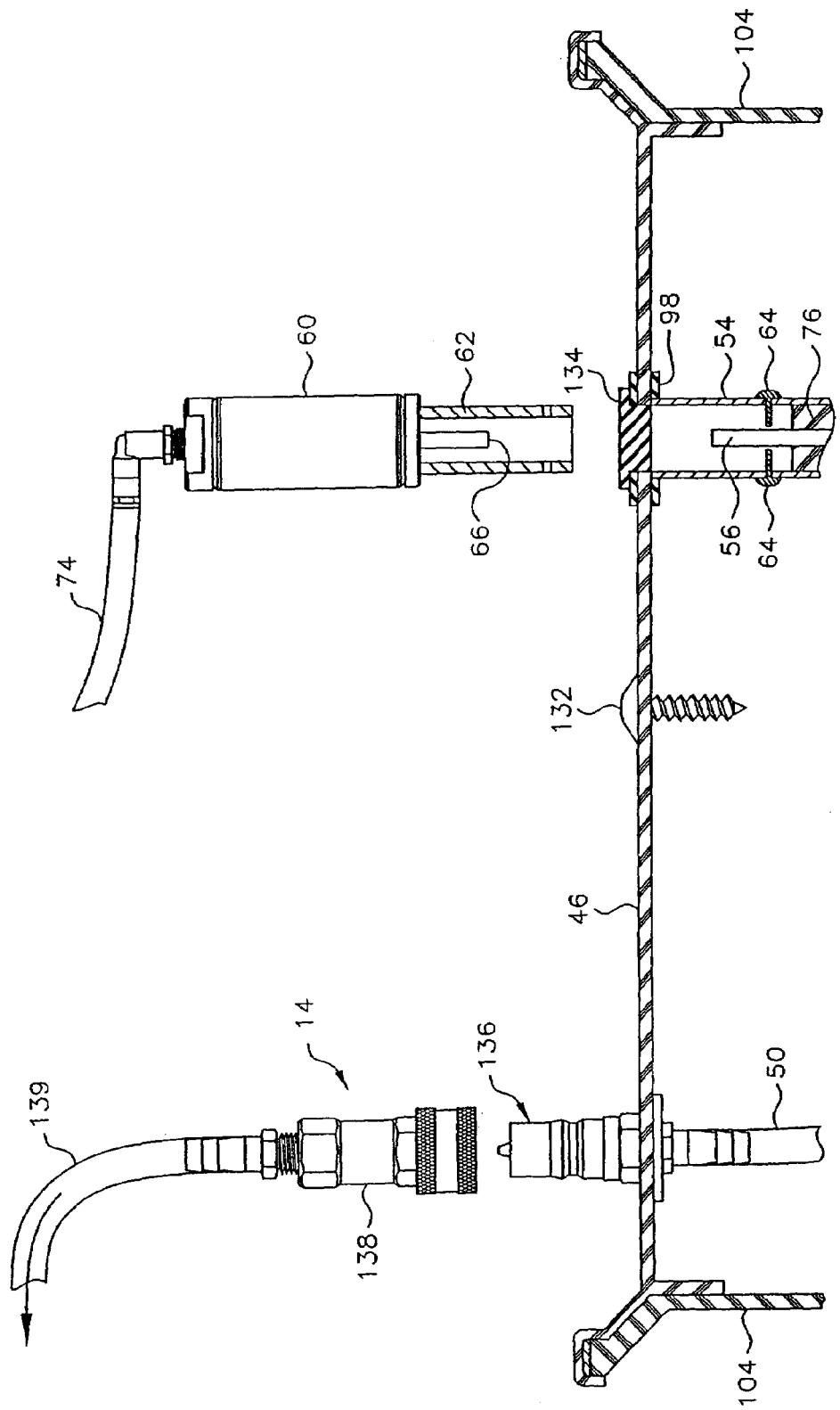
FIG. 5 is a broken sectional front view of the lid portion of the container illustrated in FIG. 1 showing container replacability structure facilitating color on-the-fly switchover in accordance with the invention.

Referring to FIG. 5, which is a broken view mostly in section of the upper portion of container body 104 and lid 46, the quick disconnect, disposable and recyclable coupling associated with container 12 is illustrated. In addition to facilitating quick changeover, the quick disconnect also enhances the disposable and recyclable characteristics of the pump-container combination. In FIG. 5, the self-sealing quick disconnect fitting 14 is shown disconnected, revealing a self-sealing male portion 136 and a self-sealing female portion 138. Male portion 136 is preferably essentially permanently secured to lid 46 of container 12 while female portion 138 is preferably connected to a color supply hose 139 leading to a gravimetric blender or other device which receives and uses liquid color furnished by diaphragm pump 18. Fitting 14 can be disengaged by separating female portion 138 from self-sealing male portion 136 via manual force; any adult of reasonable strength and dexterity can do this. The individual parts of male and female portions of self-sealing quick disconnect fitting 14 have not been individually numbered or described herein since quick disconnect self-sealing fittings, such as designated 14 in the drawings, are well known in the art.

A vent screw 132 is positioned in lid 46 and may be turned manually in the event atmospheric pressure is needed in container 12 as pump 18 evacuates liquid color from container 12.

Still referring to FIG. 5, pneumatically driven piston-cylinder combination 60 and adapter 62 are shown removed from their positions, within lid 46, in which those components are illustrated in FIGS. 1 and 2. When piston-cylinder combination 60 and cylindrical adapter 62 are removed from lid 46, a stopper designated 134 in FIG. 5 is preferably put in place to guard against contamination entering the open interior of container interior cylinder 54. As is the case with self-sealing quick disconnect fitting 14, piston-cylinder combination 60 and adapter 62 may be manually engaged with or disengaged from container interior cylinder 54 and actuator rod 56 by any adult of moderate strength.

To operate diaphragm pump 18, piston-cylinder combination 60 is actuated by application of gas, preferably air, thereto via input line 74. Reciprocation of the piston portion of piston-cylinder combination 60 causes corresponding reciprocation of piston rod 66. As piston rod 66 reciprocates, rod 66 contacts actuator rod 56 thereby causing actuator rod 56 to reciprocate in the vertical direction considering the drawing figures. Vertical reciprocation of rod 56 causes corresponding vertical reciprocation of flange 58. Since flange 58 is in contact with upper surface 124 of diaphragm 36, diaphragm 36 distends downwardly into the open interior cavity portion 26 of pump body 24.

Advancement of diaphragm 36 into open interior cavity portion 26 of pump body 24 increases the pressure of liquid color material resident therein. This diaphragm displacement and resulting pressure increase causes liquid color material in cavity portion 26 to flow through liquid color intermediate passageway 92, past outlet check valve 42, through outlet passageway 33, and out of container 10 via liquid color outlet line 50.

During the upward portion of the reciprocation of the interior piston of piston-cylinder combination 60 and actuator rod 56, diaphragm 36 initially moves towards an unstressed horizontal position in response to force exerted by spring 38 on spring cap 96 contacting diaphragm 36; continued application of force by spring 38 on spring cap 96 contacting diaphragm 36 distends diaphragm 36 further upwardly. The resulting void created in open interior cavity portion 26 of pump body 24 causes liquid color material to flow by suction through liquid color inlet aperture 30, past inlet check valve 34 into open interior cavity portion 26 of pump body 24. After the interior piston of piston-cylinder combination 60 has completed upward movement and commences a new reciprocation by moving piston rod 66 and hence actuator rod 56 downwardly, again pushing diaphragm 36 vertically downwardly into open interior cavity portion 26, flange 58 again displaces diaphragm 36 against the force of spring 38 into open interior cavity portion 26 and liquid color is again urged past outlet check valve 42, through liquid color outlet passageway 33 and out of container 10.

While use of a pneumatically driven piston-cylinder combination to reciprocate rod 56 is preferred, an electric motor rotating a cam or a gear may also be used, as may a hydraulic motor or a solenoid.

Figure 7:
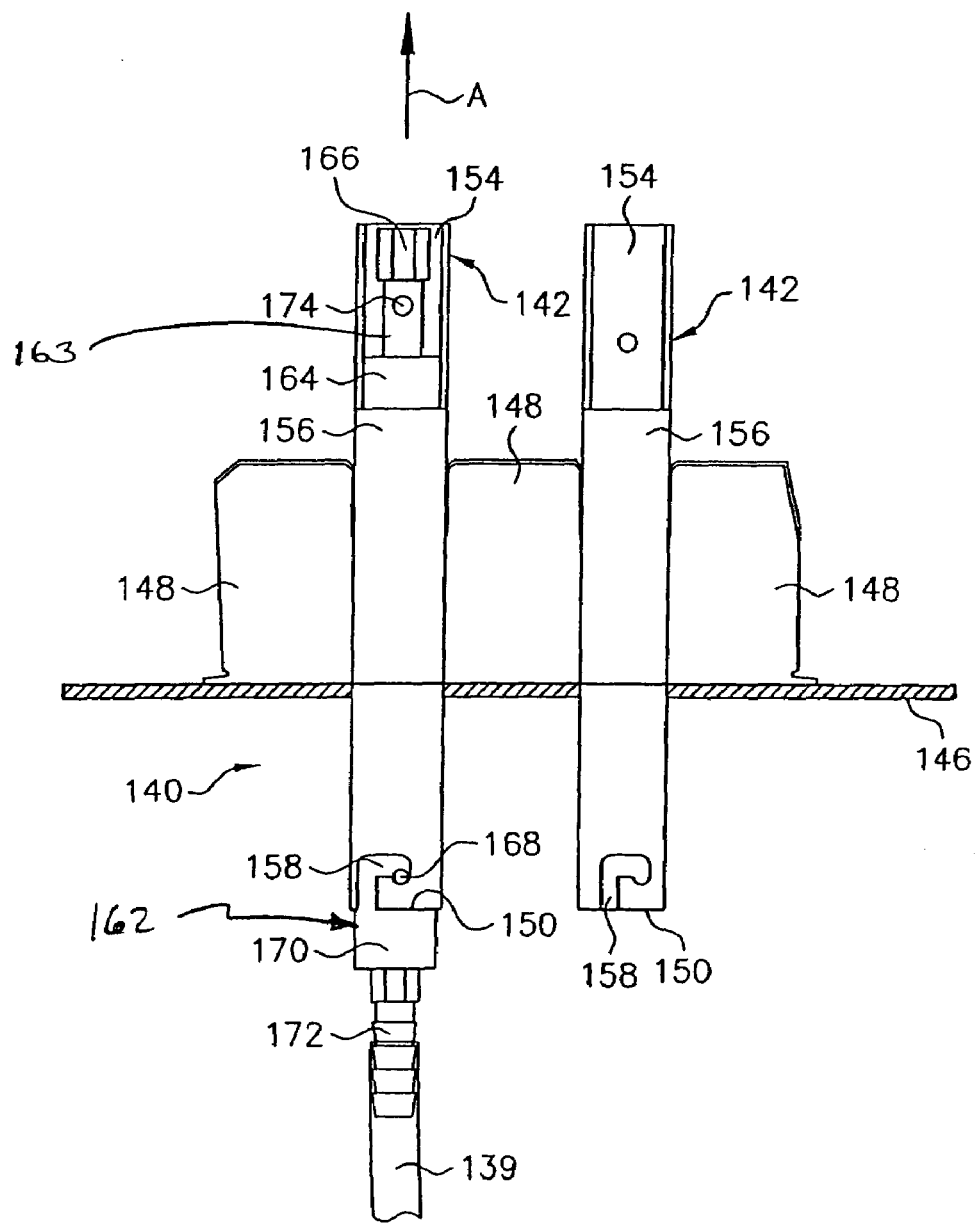
FIG. 7 is a broken partially schematic view of the liquid color connection apparatus illustrated in FIG. 6 and looking in the same direction as in FIG. 6 but showing one tubular connector from a liquid color container engaged with the connection apparatus.

FIGS. 6 and 7 illustrate an embodiment of apparatus for driplessly connecting and thereafter furnishing liquid color from container 12 for subsequent processing where the apparatus is shown in a disconnected disposition in FIG. 6 and in a connected disposition in FIG. 7.

Apparatus for driplessly connecting and thereafter furnishing liquid color from a container 12 is designated generally 140 in the drawings and includes a tubular member 142 secured in and passing through a mounting plate 146. A set of splash baffles 148 are connected to mounting plate 146 and to tubular member 142 in the area in which the liquid color is released and hence where some splash may occur. Tubular member 142 is hollow over its entire length; two tubular members 142 are illustrated in the embodiment illustrated in FIGS. 6 and 7. Mounting plate 146 allows apparatus 140 to be fastened, by bolts or by welding, directly to the frame of a gravimetric blender so as to position one or more liquid color outlet apertures of apparatus 140 for delivery of liquid color material directly into the weigh bin of the blender.

An inlet end of tubular member 142 is designated 150 and is located outside the liquid color dispensing area, typically being separated from such dispensing area by mounting plate 146. Desirably formed within the annular facing end surface defining inlet end 150 of tubular member 142 is a slot 158 preferably configured as shown in FIGS. 6 and 7. Slot 158 opens into the annular axially facing surface defining inlet end 150 of tubular member 142. Proceeding axially from that position along tubular member 142, slot 158 has an axially extending portion followed by an angularly transversely extending portion running at right angles to the axis of tubular member 142. At the end of the angularly extending portion, a small axial undercut is formed, as shown in the drawings. Neither the axial nor the angular transverse portions of slots 158, nor the undercuts, have been separately numbered in the drawings.

A portion of exterior wall 156 of tubular member 142 is cut away; preferably this is a portion subtending an angle of about one hundred eighty degrees (180°) relative to the axis of tubular member 142. This cutaway serves to expose an interior wall portion 154 of tubular member 142 as illustrated generally at the top of FIGS. 6 and 7. Within the cutaway portion, a screw 152, serving as a stop, is provided in the remaining wall portion of tubular member 142. The head of screw 152 desirably fits into the portion of the wall of tubular member 142 which would be the interior thereof, were the facing portion of the wall not cut away.

Apparatus 140 further includes a tubular conduit assembly designated generally 162 in FIGS. 6 and 7. An end plug 166 closes one end of tubular conduit assembly 162. A fluid connecting member 172 is positioned in the other end of tubular conduit assembly 162 for connection with a color supply hose 139 leading from closable container 12 having liquid color and diaphragm pump 18 located therewithin.

Tubular conduit assembly 162 further includes an axially slidable preferably cylindrically configured sleeve 164 which is desirably sized to fit slidably within tubular member 142. Tubular conduit assembly 162 preferably further includes a cylindrical spacer 170, which is desirably fixed to tubular conduit assembly 162 and is also sized for sliding entry into the interior of tubular member 142. A spring 160 is positioned between cylindrical spacer 170 and slidable sleeve 164 and wraps around a tubular conduit portion 163 of tubular conduit assembly 162. Spring 160 biases slidable sleeve 164 in a direction towards the top of the paper in FIG. 6, away from cylindrical spacer 170.

Extending laterally from cylindrical spacer 170 is a spacer pin 168 sized for mating engagement with one of slots 158.

A liquid color outlet aperture 174 is formed in tubular conduit 163 proximate the end thereof, adjacent to end plug 166, as shown in FIG. 7.

When dripless connection apparatus 140 is in the configuration illustrated in FIG. 6 where tubular conduit assembly 162 is not resident within tubular member 142, tubular conduit liquid color outlet aperture 174 is covered by slidable sleeve 164. Desirably, the inner diameter of slidable sleeve 164 is only slightly larger than the outer diameter of the interior conduit portion 163 of tubular conduit assembly 162 so that liquid color material cannot escape from the interior of conduit 163 through aperture 174 when aperture 174 is covered by slidable sleeve 164.

Because cylindrical spacer 170 is fixed to tubular conduit 163, spring 160 continuously biases slidable sleeve 164 into a position covering liquid color outlet aperture 174. Accordingly, even though tubular conduit assembly 162 may be connected to a liquid color supply line 139 by connecting member 172 and liquid color may be within supply hose 139, until slidable sleeve 164 is moved against the bias of spring 160 and exposes liquid color outlet aperture 174, no liquid color flows from dripless connection apparatus 140.

When it is desired to supply liquid color, tubular conduit assembly 162 is inserted into tubular member 142 in the direction indicated by arrow A in FIG. 6. Slidable sleeve 164 enters tubular member 142 at the inlet end 150 thereof and moves slidably through tubular member 142 until a forward annular end surface 176 of slideable sleeve 142 contacts screw 152 serving as a stop. As tubular conduit assembly 162 is forced further into tubular member 142, interference between screw 152 and annular end surface 176 of slidable sleeve 164 precludes further movement of slidable sleeve 164 in the direction indicated by arrow A in FIGS. 6 and 7. However, since the remainder of tubular conduit assembly 162 continues to move in the direction of arrow A in FIG. 7, the portion of tubular conduit 162 which is axially adjacent and connected to end plug 166 continues to move in the direction of arrow A in FIG. 6, past screw 152. This relative motion between the portion of tubular conduit assembly 162 residing within slidable sleeve 164 and slidable sleeve 164 itself exposes the portion of tubular conduit 163 in which liquid color outlet aperture 174 is located; this is illustrated in FIGS. 6 and 7.

In order to secure apparatus 140 in this position, at which liquid color may flow freely out of outlet aperture 174, tubular conduit assembly 162, conduit 163 and cylindrical spacer 170 are moved manually further in the direction indicated by arrow A, against the bias resulting from spring 160 being compressed between cylindrical spacer 170 and slidable sleeve 164, until spacer pin 168 is in a position to enter slot 158. At that position, cylindrical spacer 170 is moved manually slightly axially further in the direction of arrow A until pin 168 reaches the angular portion of slot 158, whereupon a small manual rotation of cylindrical spacer 170 moves pin 168 into the angular transverse portion of slot 158, where the axial undercut is located. This serves to retain tubular conduit assembly 162 in engagement with tubular member 142 in the configuration illustrated in FIG. 7, whereby liquid color material may be delivered via outlet aperture 174.

For drawing clarity, dripless connection apparatus 140 in FIGS. 6 and 7 has been illustrated with only a single tubular conduit assembly 162 engaging a tubular member 142. However, the invention embraces but is not limited to use of apparatus such as illustrated in FIGS. 6 and 7 to connect a plurality, and in any event preferably at least two, closable containers 12 having liquid color diaphragm pumps 18 therewithin to a gravimetric blender or other device for the direct supply of liquid color on demand to the gravimetric blender or some other device, preferably specifically to the weigh pan of the gravimetric blender, as illustrated in FIG. 8.

Figure 8:
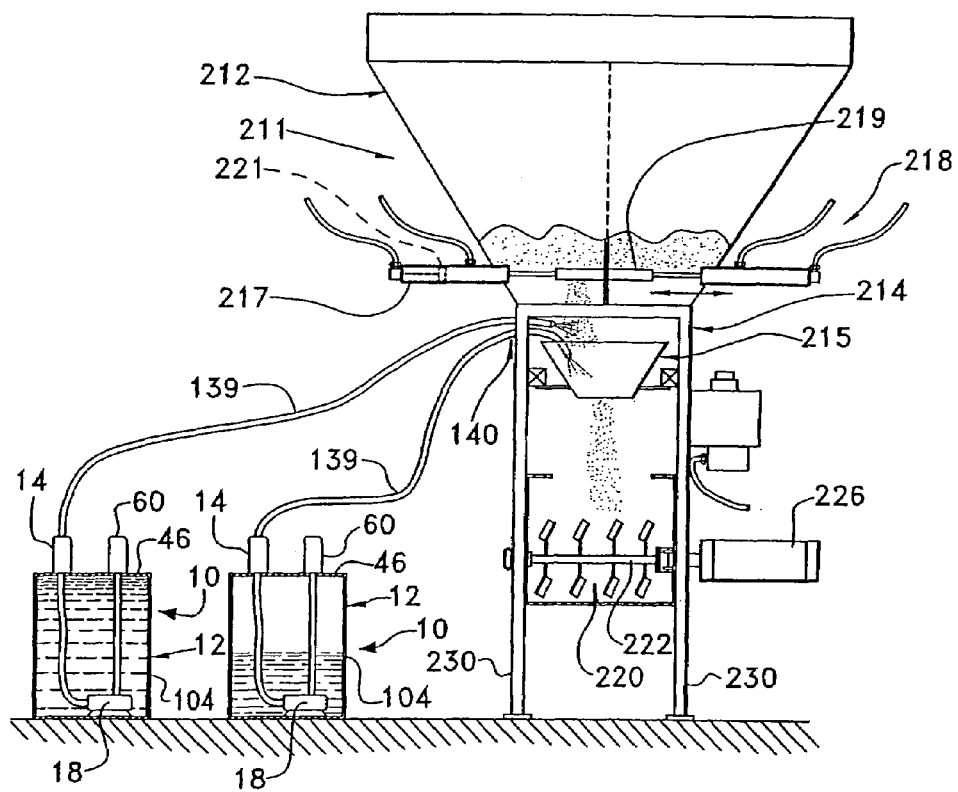
FIG. 8 is a schematic side elevation of a gravimetric blender connected to two closeable containers of liquid color material with liquid color diaphragm pumps therewithin.
Figure 9:
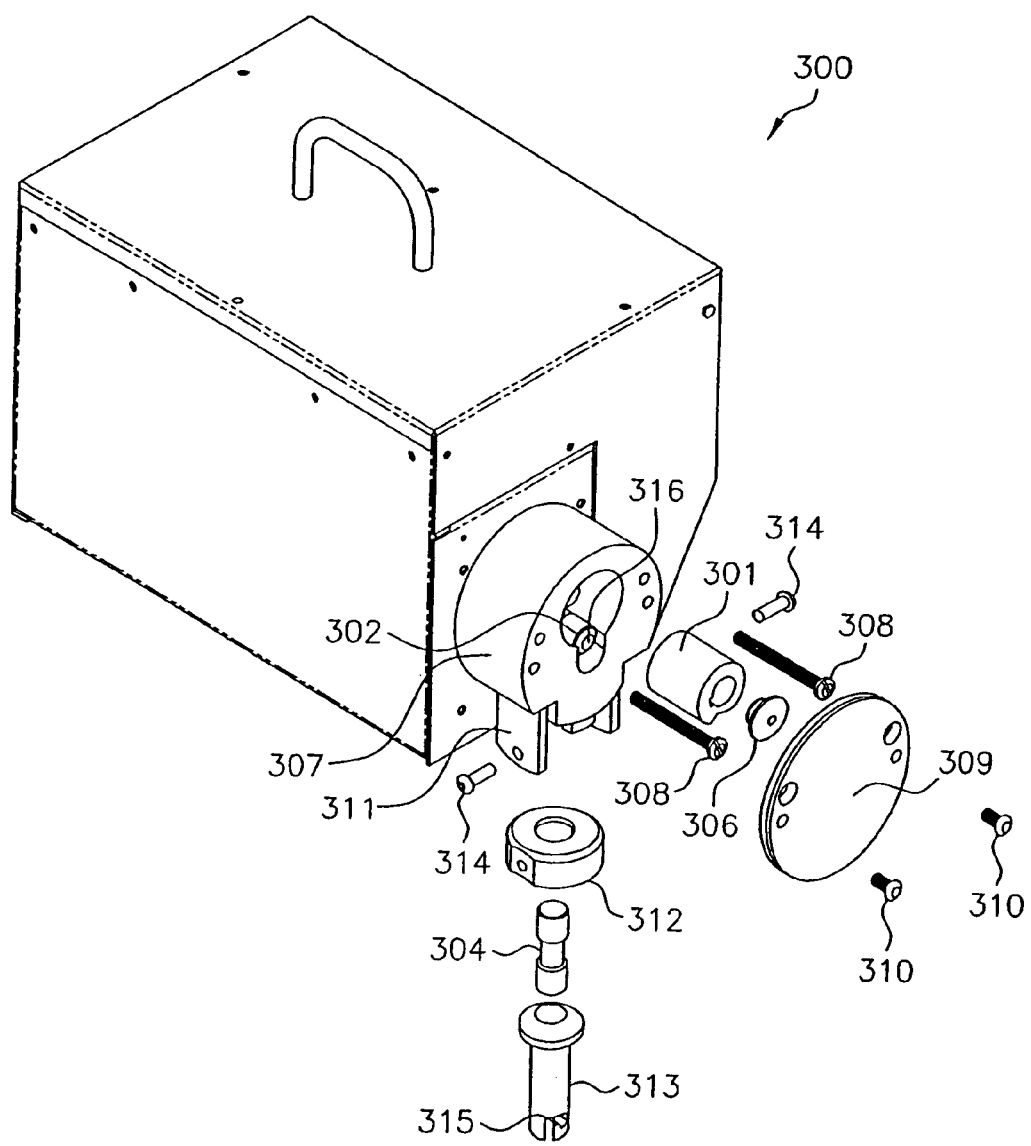
FIG. 9 is a partially exploded isometric view showing a volumetric controller specifically adapted for modification of the apparatus illustrated in FIG. 1.
Figure 10:
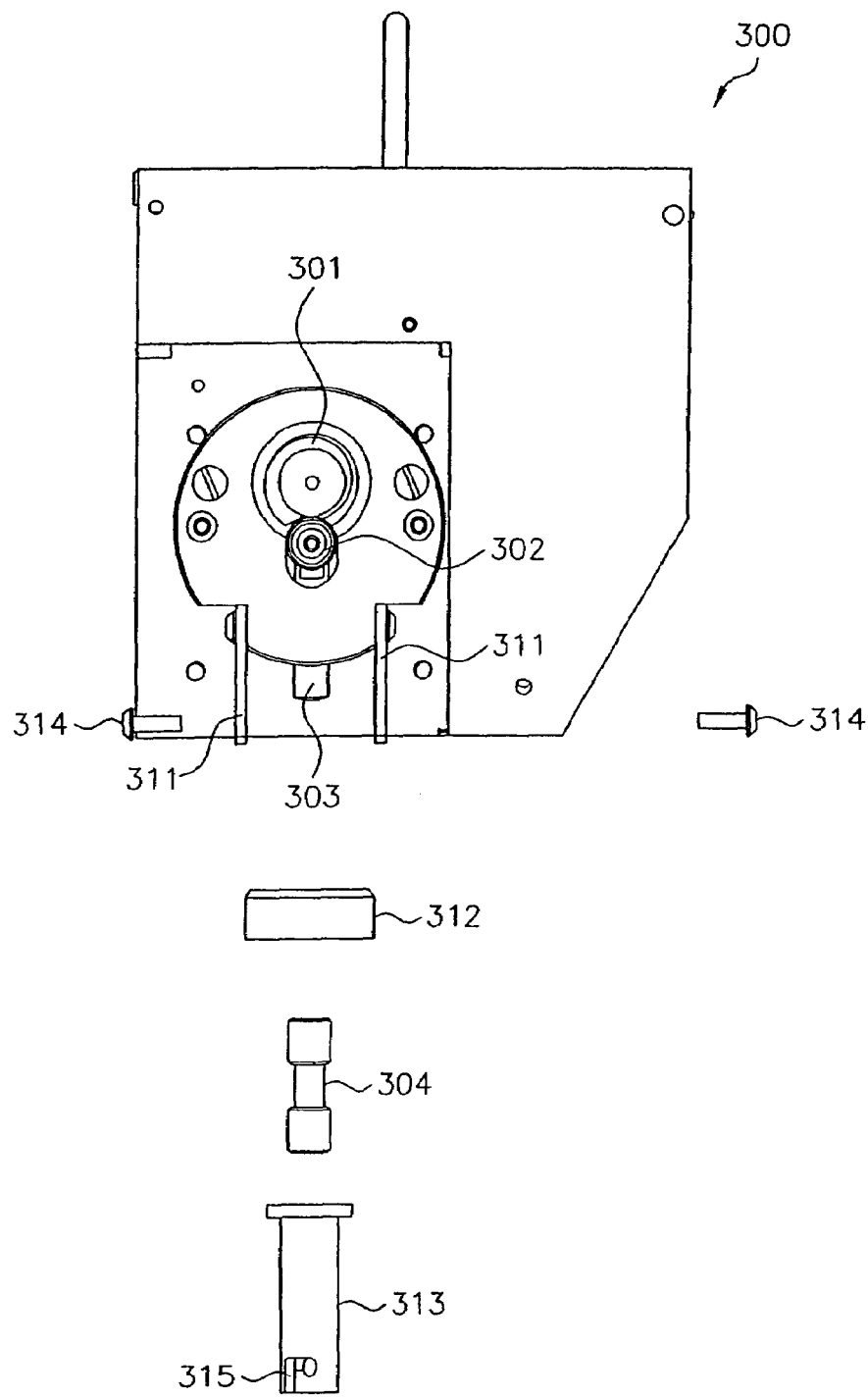
FIG. 10 is a similarly partially exploded side view of the volumetric controller shown in FIG. 9.

Continuing with reference to FIG. 8, a gravimetric blender of the type disclosed in U.S. Pat. No. 6,007,236 and WO97/21528 is designated generally 211. The apparatus for furnishing liquid color material as described above may, but need not, furnish liquid color to gravimetric blender 211. The apparatus for furnishing liquid color as described above, when used in conjunction with a gravimetric blender 211, may be controlled by the microprocessor portion of gravimetric blender 211.

Gravimetric blender 211 includes a hopper, designated generally 212, supported by a frame designated generally 214 which holds a weigh bin 215 into which portions of plastic resin material and liquid color material are metered and optionally weighed prior to release into a mix chamber 220. Frame 214 may be a single piece or multiple pieces and as illustrated includes four upstanding members, which are preferably steel angle iron and are identified 230, with two of upstanding members 230 being shown in FIG. 8. Frame 214 preferably further includes webs connecting upstanding members 230 together to provide rigidity. These webs have not been illustrated.

Hopper 212 preferably has multiple internal compartments so that a plurality of different solid resinous materials may be dispensed from hopper 212 into weigh bin 215 preferably by orientation of suitable slide gates or other valve apparatus designated generally 219, located at the bottom of a given compartment of hopper 212. Hopper 212 may also be provided as a plurality of individual hoppers, each having only a single compartment.

Gravimetric blender 211 preferably further includes pneumatically actuated pistons 221, housed within cylinders 217. Pistons 221 are connected with hopper 212 via slide gates 219. Pistons 221 are pneumatically powered and operate in response to signals to move slide gates 219 thereby to release material stored within hopper 212 downwardly towards weigh bin 215. The pneumatic piston-cylinder actuated slide gate combinations are designated generally 218 in FIG. 8.

Alternatively, one or more auger feeders may be used in lieu of a portion of hopper 212 and an associated slide gate. Auger feeders are desirably used for components which are added in amounts of five percent (5%) by weight or less to the mix blend; however, auger feeders add to the cycle time for each batch and reduce overall throughput rates. Hence, auger feeders are desirably optionally used only for addition of low weight percentage components to the blend to be mixed.

Positioned within and preferably slidably retained in place by frame 214 below weigh bin 215 is a mix chamber 220 having a mixing agitator 222 rotatably disposed therewithin. Agitator 222 is mounted for rotation about an axis preferably shared with a drive motor 226. Motor 226 preferably has its drive shaft positioned to drive mixing agitator 222 about the common axis. Drive motor 226 is preferably supported by a cantilever support, which has not been illustrated in the drawing for clarity, extending laterally from an upstanding member 230 of frame 214. Mix chamber 220 may be preferably fabricated to be slidably removable from frame 214 with mix chamber 220 preferably being moveable in a direction parallel with the axis of agitator 222. Blender 211 may be positioned to furnish blended resin material directly to a molding press or extruder.

A major advantage provided using the closable container 12 with liquid color and a diaphragm pump 18 therewithin together with the dripless connection apparatus 140 of the type illustrated in FIGS. 6 and 7 is facilitation of automatic changeover from a first closed container of liquid color material to a second closed container of liquid color material when the first container is exhausted without interrupting the supply of liquid color material to the gravimetric blender, or even to a process machine such as a molding press or an extruder.

One such arrangement is illustrated in FIG. 8 where two apparatus according to the invention for furnishing liquid color have been designated generally 10 and include closable containers 12 having liquid color therewithin and diaphragm pumps 18 within the closable containers 12. In this arrangement, the pumps 18 within liquid color containers 12 are optionally and desirably controlled by the same microprocessor which operates and controls the gravimetric blender 211. Liquid color material and various components of solid granular resin material, for example virgin resin material, recycled resin material and additives (which further facilitate the ultimate molding or extrusion process) are respectively serially dispensed for preselected times with the liquid color material being dispensed by actuating a diaphragm pump 18 located within a container 12. Desirably pump 18 cycles by pulsing in response to the digital pulses of the microprocessor and the associated clock function as the microprocessor regulates the entire resin material-liquid color measurement and blending process.

The blender preferably operates to weigh the contents of weigh bin 215 after each of the dispenses of liquid color material and any of the various components of solid granular resin material. Each weighing operation preferably compares measured weight to a predetermined recipe amount weight for a given component most recently added to the weight bin. This process continues with such dispensing for so long as measured weight of the weigh bin contents compares properly to the predetermined recipe amount according to preset criteria. However, pumping is halted from a first container 12 and initiated from a second container 12 using the diaphragm pump 18 located within that second container, to uninterruptedly continue the dispenses of liquid color and resin material components into the weigh bin of the gravimetric blender, whenever the comparison indicates there has been no dispense of liquid color material or an insufficient dispense of liquid color material from the first container into weigh bin 215. Having both containers 12 connected to blender 211 by dripless connection apparatus 140 permits the process to operate continuously, since as first container 12 is exhausted and the pump 18 of second container 12 is actuated, liquid color continues to flow through a selected set of telescoping conduits of apparatus 140 without spillage. Once pumping from second container 12 has commenced, first container 12 may be disconnected using apparatus 140 and replaced with a fresh, full container 12.

Referring to FIGS. 9 through 12, a preferred volumetric controller 300 is shown. Volumetric controller 300 is microprocessor controlled and preferably dispenses liquid color by volume.

Volumetric controller 300 controls movement of diaphragm 36 in a manner to accurately dispense a measured amount of liquid color. When volumetric controller 300 is used as an alternative to furnish liquid color to gravimetric blender 211, volumetric controller 300 preferably replaces piston-cylinder combination 60, rod 66, cylindrical adapter 62, and input line 74.

Volumetric controller 300 preferably includes a cam 301, a cam follower 302, a vertical oriented pin 303, a spool 304, and a motor 305. The output shaft of motor 305 extends through cam 301 and is held in place by a cam cap 306 within a cam housing 307, retaining in place by cam housing screws 308 together with a cover 309 and cover screws 310.

Cam 301 has a varying outer surface radius and a constant radius inner surface. The radius of the outer surface of cam 301 gradually increases over almost three-hundred sixty (360) degrees and then abruptly drops down to its initial value. Motor 305 is preferably a D.C. motor.

Figure 12:
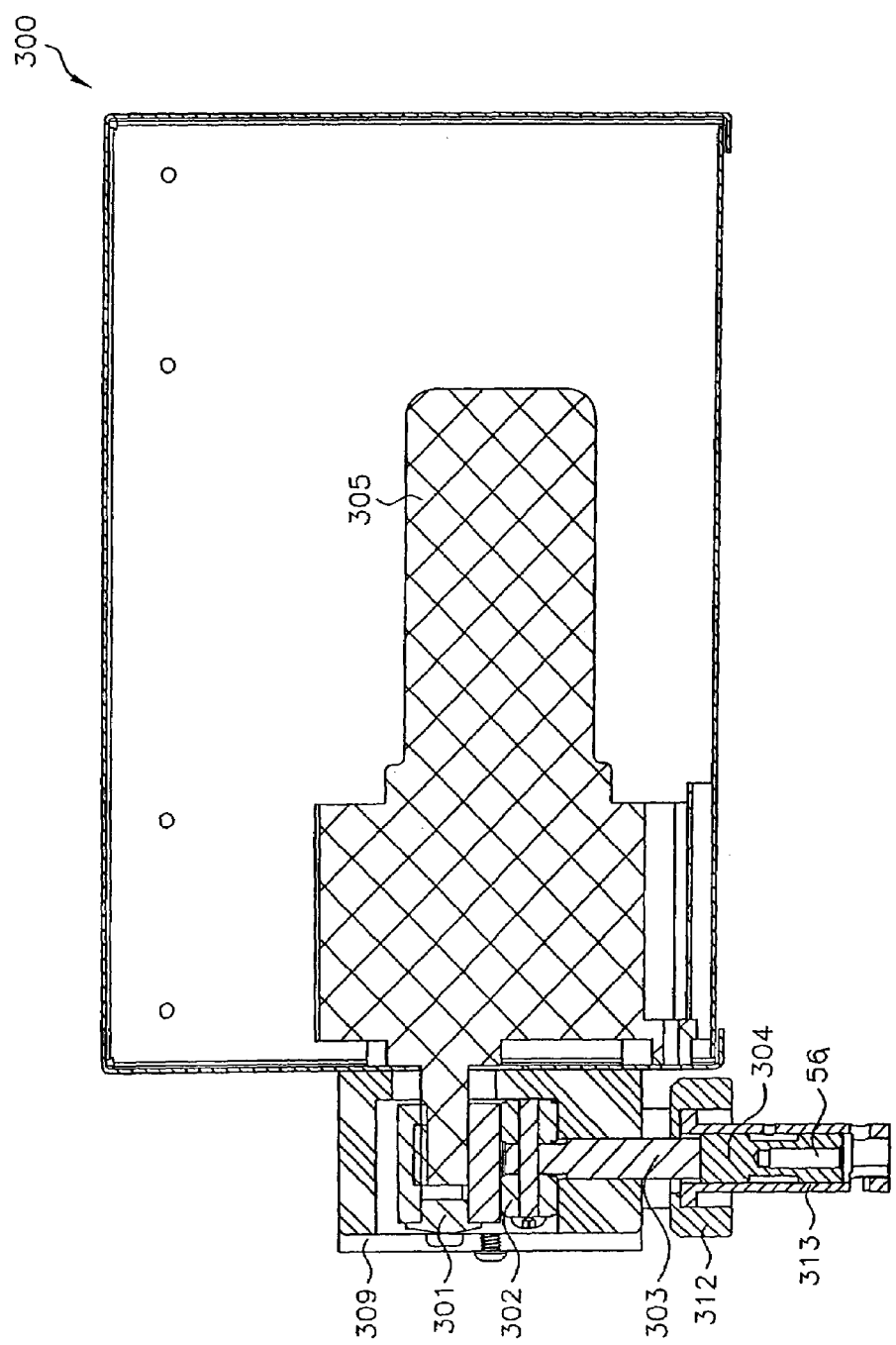
FIG. 12 is a cross-sectional view of a volumetric controller taken at 12-12 in FIG. 11b.

Cam follower 302 preferably comprises a roller which is in riding contact with the outer surface of cam 301 and is secured via roller screw 316 to the top of pin 303. The bottom of pin 303 is in contact with the top of spool 304. As shown in FIG. 12, the bottom of spool 304 has a passageway extending approximately halfway through spool 304. The top of actuator rod 56 extends into this passageway.

Volumetric controller 300 preferably further includes mounting brackets 311, mounting ring 312, and a cylindrical adapter 313 for securing volumetric controller 300 to closeable container 12. Mounting ring 312 is annular and has an inner radius sized so that pin 303 may pass through the center of ring 312 and make contact with the top of spool 304. Mounting ring 312 is attached to mounting brackets 311 with screws 314.

Cylinder adapter 313 is preferably adapted to rest inside container interior cylinder 54 of container 12, and thus has a outer diameter slightly less than the inner diameter of cylinder 54. A pair of radially opposed positioning screws 64 extend radially inwardly within cylinder 54. Adapter 313 has a pair of radially opposed slots 315 that open vertically downwardly and correspond to screws 64. Slots 315 extend axially within adapter 313 and then turn ninety degrees (90°) and extend a short distance angularly around cylindrical adapter 313. These slots extend entirely through the wall of adapter 313. The openings of slots 315 are positionable for engagement with screws 64. An advantageous feature of this connection is that volumetric controller 300 is adapted to connect to container 12 without any tools or significant time commitment. The connection process is a simple "twist and lock" motion.

Figure 13:
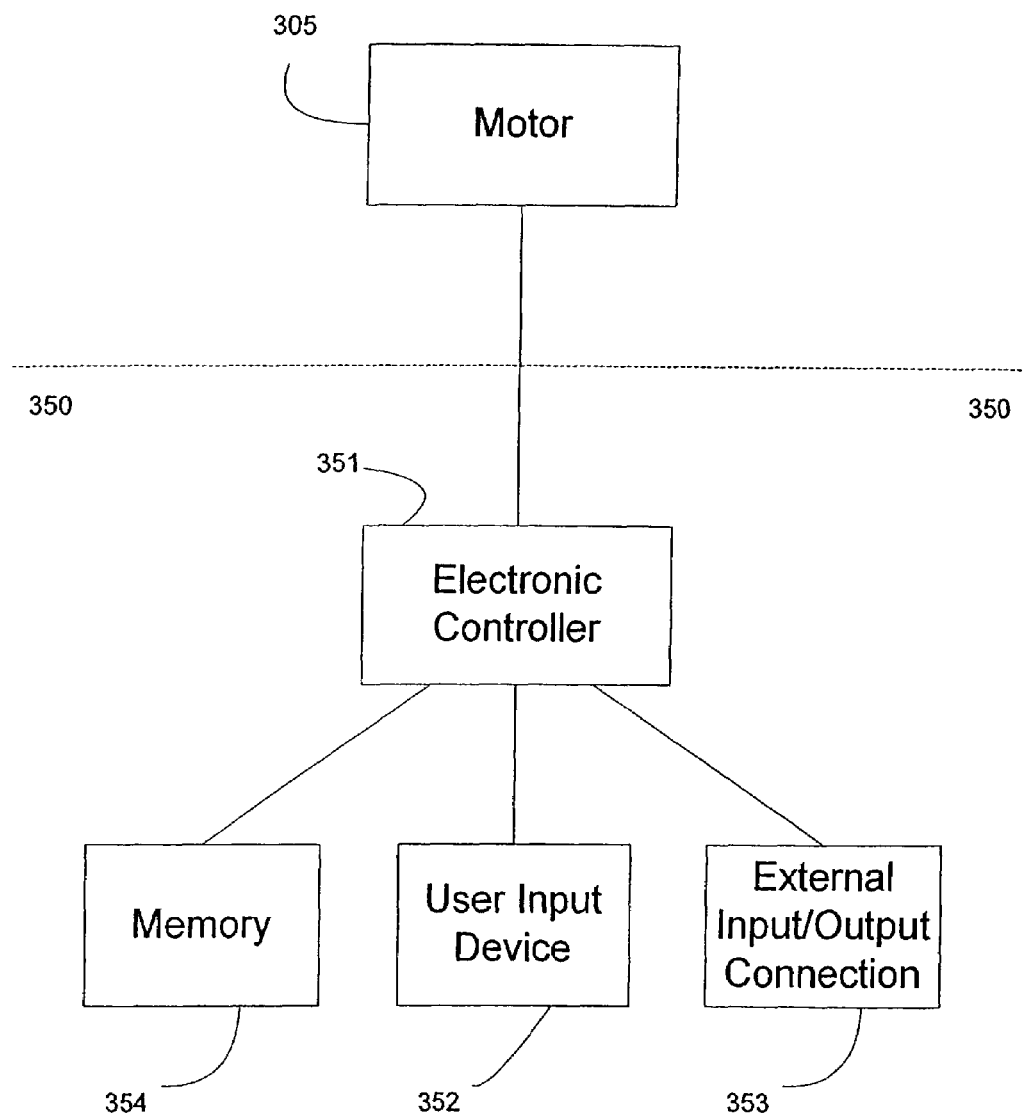
FIG. 13 is a block diagram schematic of an electronic control means for practice of aspects of the invention.

Referring to FIG. 13, motor 305 is preferably managed by on-board drive control means 350 including an electronic controller 351, a memory 354 which is preferably of the type which may be written over to replace one set of data and instructions stored therewithin with another, and at least one user input device 352 and/or external input/output connection 353 Electronic controller 351 is preferably pre-programmed with the parameters of cam 301, including for example, dimensions relating to the minimum outer diameter of the cam, the maximum outer diameter of the cam, the parameters of the increase in outer diameter of the cam, and the drop in cam outer diameter.

Electronic controller 351 is also pre-programmed with information representative of the volume of liquid color that diaphragm pump 18 evacuates with each complete and/or partial rotation of the output shaft of motor 305. Other preferably pre-programmed information includes the volume of liquid contained in container 12 when full, as well as an algorithm for ascertaining the remaining amount of liquid color after diaphragm 36 has displaced a measured amount of liquid color. The electronic instructions are preferably hardwired into electronic controller 351 and/or stored in write-over memory 354. A user can dynamically program electronic controller 351 with these and other instructions.

For example, electronic controller 351 can be dynamically programmable via user input device 352 or be in communication with electronic controller 351 via input/output connection 353. Controller 351 may include a scanner (not shown) that reads instructions.

Input device 352 is used by an operator to program a specific volume of liquid color to be dispensed by diaphragm pump 18 driven by motor 305. Input device 352 is preferably an on-board volumetric controller 300 and may include, for example and without limitation, on/off switches, buttons, alphanumeric keyboards and thumb-scroll devices. Volumetric controller 300 may include a display screen (not shown) that displays input, status and other information.

Electronic drive control means 350 may be utilized for indirectly regulating flow of liquid by regulating actuation, speed, acceleration, etc. of motor 305. Control signals may be sent from electronic controller 351 to motor 305 in response to instructions. These instructions are provided to electronic controller 351 from memory 354, via connection 353 and/or user input device 352. Electronic controller 351 receives pumping instructions from one of these sources, uses algorithms and constant values to identify the volume amount of liquid in container 12 at that moment, and sends a control signal to rotate the shaft of motor 305 in a manner calculated to ultimately cause displacement of a desired volume of liquid.

As motor 305 rotates in response to a control signal, cam 301 is rotated and the portion of the cam surface in contact with the roller 302 changes. Roller 302 contacts the outer surface of cam 301 in a manner that roller 302 rides against cam 301 as cam 301 rotates in response to rotation of the output shaft of motor 305. Due to the increasing radius of cam 301, roller 302 and pin 303 are pushed downward to the extended position between roller 302 and the central axis of cam 301.

Figure 11B:
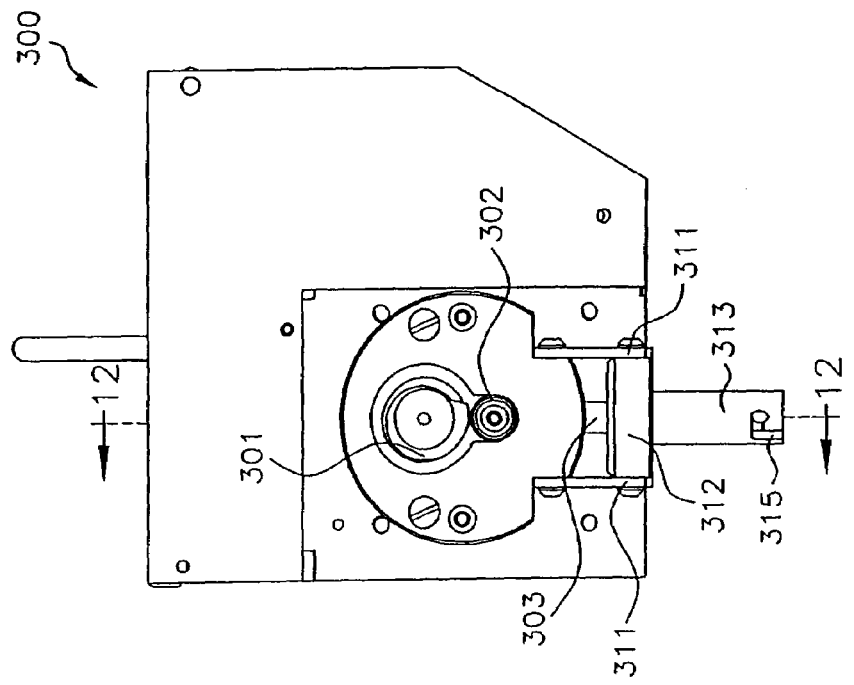
FIG. 11b is a side view of the volumetric controller shown in FIG. 9 with a roller in a downward position.
Figure 11A:
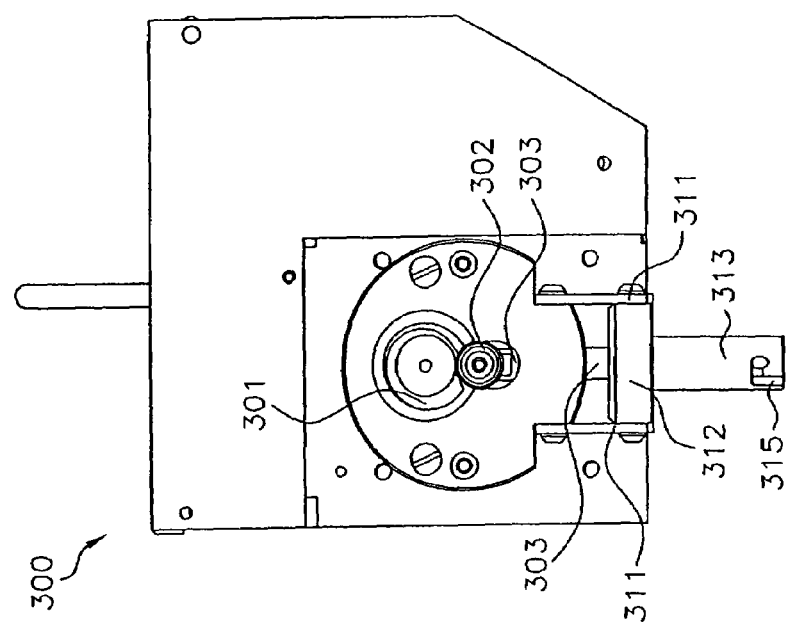
FIG. 11a is a side view of the volumetric controller shown in FIG. 9 with a roller in an upward position.

FIGS. 11a and 11b show roller 302 contacting cam 301 in both an upward and downward position. A second follower, e.g. a second roller, may be used simultaneously with the first follower and also connects to the top of pin 303. Because the bottom of pin 303 is in contact with the top of spool 304, the downward motion of pin 303 causes downward motion in spool 304 and actuator rod 56, and eventually diaphragm 36.

After downward motion of diaphragm 36 displaces the liquid color, diaphragm 36 moves upwards due to its own restoring force as well as force exerted by spring 38. This in turn forces actuator rod 56, spool 304, and pin 303 upward. This forces roller 302 upward, facilitating continuous contact with cam 301 when the outer surface radius of cam 301 abruptly drops from a maximum value to a minimum value. The reciprocating motion of diaphragm 36 repeats itself so long as motor 305 is actuated.

If desired, multiple containers 12, each with a corresponding volumetric controller 200, can be slaved to a single master. For example, a first closeable container 12 can be attached to a first volumetric controller 300 having a first electronic controller 351, while a second closeable container 12 can be attached to a second volumetric controller 300, having a second electronic controller 351 (not shown). Both may be slaved to a single external device (master) via their respective input/output connections 353.

The single external master is then used to send and receive control signals to each of the electronic controllers, switching off motor 305 (and hence diaphragm pump 18) of the container which is low on liquid color, for example, and switching on the motor 305 (and hence diaphragm pump 18) of a full container. The external device can also simultaneously control output volumes of several containers 12, each containing different liquid colors. When all slave containers are empty or have run low on liquid color, a signal is preferably communicated from electronic controller 351 to the master to indicate to remote personnel that the container(s) 12 needs to be changed.

While pneumatic power is the preferred form of power for the diaphragm pump in accordance with the invention, electrical, mechanical or hydraulic actuation of diaphragm 36 may also be provided.

While diaphragm pump 18 has been illustrated in all cases as being within liquid color container 12, diaphragm pump 18 might be located only partially within or even outside a suitable container 12.

While the interior portion of pump body 24 has been illustrated with a particular stepped generally cylindrical configuration, other shapes, both tapered and non-tapered, may also be utilized. Likewise, while springs 38 and 68 have been illustrated as coil springs, other spring forms and sources of bias such as leaf springs, bow springs and the like may also be used.

An advantage of the embodiment of the invention illustrated in FIG. 1 is that since pneumatic power is not introduced in the interior of container 12, there is little risk of leakage of liquid color material out of container 12.

While the liquid color diaphragm pump 18 has been illustrated as a diaphragm pump, a piston pump might also be used. However, a diaphragm pump is preferable because there is no moving seal, only a flexing diaphragm which remains fluid tight. If a piston pump were used and the piston seal leaked air, the leaking air would enter the liquid color container. Resulting pressure buildup in the liquid color container could force the liquid color through the check valves and the entire contents of the container could empty just from the force of the leaking air. Accordingly, diaphragm power is preferable.

What is claimed is:

1. A method for supplying liquid color material as a portion of plastic resin material to be further fabricated by molding or extrusion, comprising the steps of:
   a. serially dispensing liquid color material and resin material into the weigh bin of a gravimetric blender by pumping said liquid color material from a container of the same with a diaphragm pump located in said container according to relative position of a rotatable cam;
   b. weighing contents of said weigh bin to determine whether there has been a dispense of liquid color thereinto;
   c. continuing to pump from said container as needed for so long as weighing the contents of said weigh bin indicates there has been a dispense of liquid color material thereinto but stopping said pumping from said container and commencing pumping liquid color material from a second container by using a diaphragm pump located thereon when weighing the contents of said weigh bin indicates lack of dispense of liquid color material thereinto.

* * * * *